United States Patent
Tiwari et al.

(10) Patent No.: US 9,174,626 B2
(45) Date of Patent: Nov. 3, 2015

(54) METHODS AND SYSTEMS FOR CONTROLLING SHIFTING BETWEEN OPERATING MODES IN HYBRID VEHICLES

(75) Inventors: Awadesh Tiwari, Bangalore (IN); Deepa Kesavan, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2337 days.

(21) Appl. No.: 12/020,295

(22) Filed: Jan. 25, 2008

(65) Prior Publication Data
US 2009/0192014 A1 Jul. 30, 2009

(51) Int. Cl.
| | |
|---|---|
| *B60W 10/08* | (2006.01) |
| *B60K 6/365* | (2007.10) |
| *B60K 6/445* | (2007.10) |
| *B60W 10/115* | (2012.01) |
| *B60W 20/00* | (2006.01) |

(52) U.S. Cl.
CPC ............. *B60W 10/08* (2013.01); *B60K 6/365* (2013.01); *B60K 6/445* (2013.01); *B60W 10/115* (2013.01); *B60W 20/00* (2013.01); *B60W 2510/0604* (2013.01); *B60W 2510/244* (2013.01); *B60W 2540/10* (2013.01); *Y02T 10/6239* (2013.01); *Y10T 477/20* (2015.01); *Y10T 477/24* (2015.01)

(58) Field of Classification Search
USPC .......................................................... 477/3–7
See application file for complete search history.

(56) References Cited

U.S. PATENT DOCUMENTS

| | | | |
|---|---|---|---|
| 5,775,293 A | 7/1998 | Kresse | |
| 6,234,932 B1 * | 5/2001 | Kuroda et al. | 477/3 |
| 7,010,406 B2 | 3/2006 | Sah et al. | |

\* cited by examiner

*Primary Examiner* — Jeffrey J Restifo
*Assistant Examiner* — Erez Gurari
(74) *Attorney, Agent, or Firm* — Ingrassia Fisher & Lorenz, P.C.

(57) ABSTRACT

A method for controlling shifting between a plurality of operating modes in a hybrid vehicle includes the steps of obtaining a plurality of throttle position values, generating a comparison between a first throttle position value of the plurality of throttle position values and a second throttle position value of the plurality of throttle position values, and selectively allowing a shift between at least two of the plurality of operating modes, based at least in part on the comparison between the first and second throttle position values.

16 Claims, 8 Drawing Sheets

METHODS AND SYSTEMS FOR CONTROLLING SHIFTING BETWEEN OPERATING MODES IN HYBRID VEHICLES

TECHNICAL FIELD

The present invention generally relates to the field of hybrid vehicles and, more specifically, to methods and systems for controlling shifting between operating modes in hybrid vehicles.

BACKGROUND OF THE INVENTION

Hybrid vehicles are configured to operate in different operating modes to provide improved fuel efficiency and performance. The different operating modes are typically characterized at least in part based on a current use or nonuse of a regenerative braking feature of the hybrid vehicle. The regenerative braking feature, when in use, helps to convert kinetic energy into electrical energy and to use the kinetic energy to charge a battery of the hybrid vehicle, to thereby save fuel and/or energy.

Typically, the operating modes for a hybrid vehicle comprise driving operating modes and regeneration operating modes. In a driving operating mode, the regenerative braking feature is not in use. Examples of driving operating modes may include an acceleration driving operating mode, in which the hybrid vehicle is accelerating, a fixed gear driving operating mode, in which the hybrid vehicle is cruising, and a battery only driving operating mode, for example when the hybrid vehicle is launched. In a regeneration operating mode, the regenerative braking feature is in use. Examples of regeneration operating modes may include an electrically varying regeneration operating mode, in which deceleration is occurring during medium hybrid vehicle speeds, a fixed gear regeneration operating mode, in which deceleration is occurring during relatively high hybrid vehicle speeds, and a battery only regeneration operating mode, in which deceleration is occurring during relatively low hybrid vehicle speeds.

A hybrid vehicle typically experiences shifts, transfers, ringing, or other changes (hereafter collectively referred to as a shift or shifting) between operating modes, for example between a driving operating mode and a regeneration operating mode, based upon instructions provided by a transmission controller. The transmission controller instructions are generally based upon an accelerator pedal position that is influenced by a driver of the hybrid vehicle. However, undesired operating mode fluctuations may occur as a result of inadvertent driver-induced oscillations of the accelerator pedal and/or adverse road conditions. For example, in the case of uneven roads, speed bumps, muddy roads, or other adverse conditions, or in the case of uneven driving by the driver, the hybrid vehicle may fluctuate between driving and regeneration operating modes more often than is optimal. Certain hybrid vehicle components, such as the engine, battery, and motors, may experience frequent changes in their operating conditions. This can result in reduced component life, durability, performance, and/or drivability of the hybrid vehicle.

Accordingly, it is desirable to provide an improved method for controlling shifting between operating modes in a hybrid vehicle, for example that reduces undesired shifting between the plurality of operating modes. It is also desirable to provide a program product for improved control of shifting between a plurality of operating modes in a hybrid vehicle, for example that reduces undesired shifting between the plurality of operating modes. It is further desirable to provide a system for improved control of shifting between a plurality of operating modes in a hybrid vehicle, for example that reduces undesired shifting between the plurality of operating modes. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for controlling shifting between a plurality of operating modes in a hybrid vehicle is provided. The method comprises the steps of obtaining a plurality of throttle position values, generating a comparison between a first throttle position value of the plurality of throttle position values and a second throttle position value of the plurality of throttle position values, and selectively allowing a shift between at least two of the plurality of operating modes, based at least in part on the comparison between the first and second throttle position values.

In accordance with another exemplary embodiment of the present invention, a program product for controlling shifting between a plurality of operating modes in a hybrid vehicle is provided. The program product comprises a program and a computer-readable signal-bearing media. The program is configured to at least facilitate obtaining a plurality of throttle position values, generating a comparison between a first throttle position value of the plurality of throttle position values with a second throttle position value of the plurality of throttle position values, and selectively allowing a shift between at least two of the plurality of operating modes, based at least in part on the comparison between the first and second throttle position values. The computer-readable signal-bearing media bears the program.

In accordance with a further exemplary embodiment of the present invention, a system for controlling shifting between a plurality of operating modes in a hybrid vehicle is provided. The system comprises a sensor, a first control module, and a second control module. The sensor is configured to obtain a plurality of throttle position values. The first control module is coupled to the sensor, and is configured to receive the plurality of throttle position values, generate a comparison between a first throttle position value of the plurality of throttle position values with a second throttle position value of the plurality of throttle position values, to thereby generate a comparison therebetween, and to generate an instruction for selectively allowing a shift between at least two of the plurality of operating modes, based at least in part on the comparison between the first and second throttle position values. The second control module is coupled to the first control module, and is configured to receive the instruction from the first control module, and to selectively allow the shift between at least two of the plurality of operating modes based at least in part on the instruction.

DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
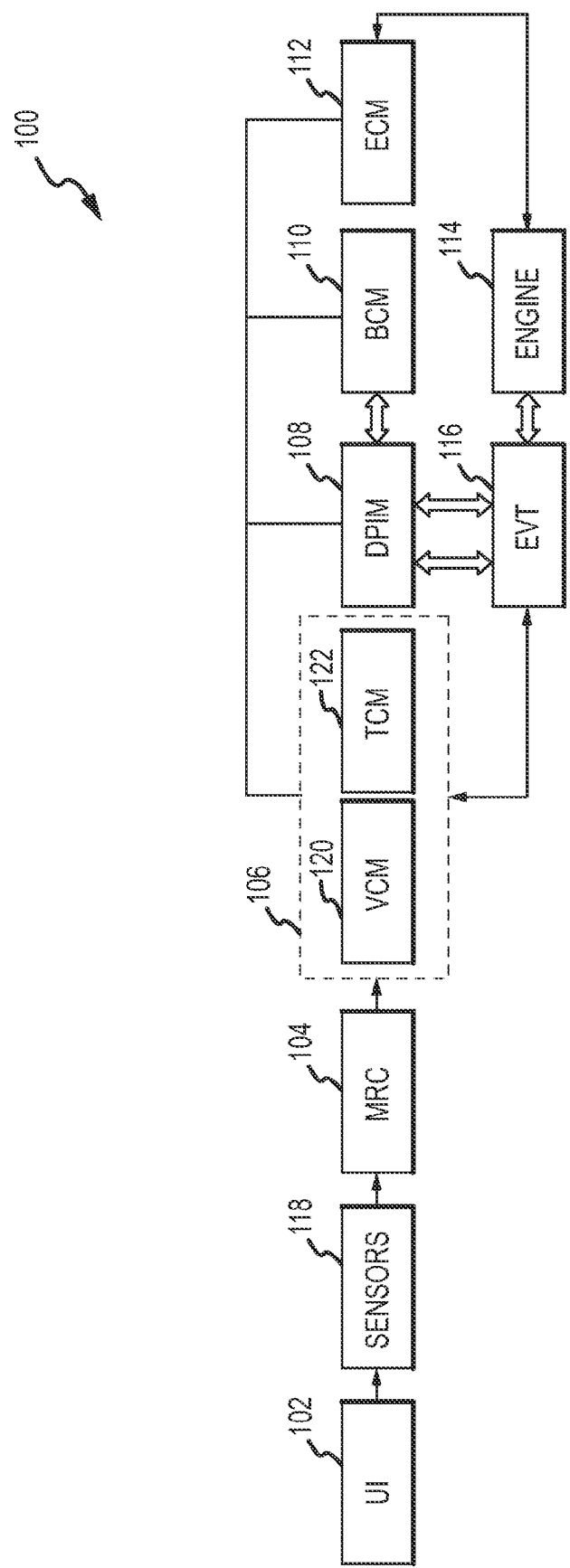
FIG. 1 is a functional block diagram of a control system for use in controlling shifting between operating modes in a hybrid vehicle (in particular, between the driving and regeneration modes), in accordance with an exemplary embodiment of the present invention.

FIG. 1 is a functional block diagram of a hybrid vehicle control system 100 for use in controlling shifting between operating modes in a hybrid vehicle, in accordance with an exemplary embodiment of the present invention. In the depicted embodiment, the hybrid vehicle control system 100 includes a user interface (UI) 102, a mode ringing control module (MRC) 104, a vehicle/transmission control module 106, a dual power inverter module (DPIM) 108, a battery control module (BCM) 110, an engine control module (ECM) 112, an engine 114, an electric variable transmission (EVT) 116, and one or more sensors 118. The hybrid vehicle control system 100 may take different forms in different embodiments. However, regardless of its particular form, the hybrid vehicle control system 100 is used to implement a process for selectively controlling shifting of the hybrid vehicle between different operating modes, such as the exemplary embodiment of the control process described further below in connection with FIG. 3

In a preferred embodiment, the user interface 102 includes an accelerator pedal for the hybrid vehicle that is engaged by a driver during operation of the hybrid vehicle. The mode ringing control module 104 receives information regarding a position of the accelerator pedal and changes in the accelerator pedal position over time for processing. For example, in one exemplary embodiment, the one or more sensors 118 are coupled between the user interface 102 and the mode ringing control module 104. The one or more sensors 118 are configured to obtain a plurality of throttle position values based on the position of the accelerator pedal. The throttle position values are transmitted to the mode ringing control module 104, and ultimately to a processor in the vehicle/transmission control module 106. For example, in one embodiment, the throttle position values, and/or other information obtained therefrom, are obtained by the mode ringing control module 104 and then transmitted to a processor within the vehicle/transmission control module 106.

The vehicle/transmission control module 106 receives the information from a sensor 118 and/or the mode ringing control module 104, and facilitates control of shifting between operating modes of the hybrid vehicle based upon this information. In one preferred embodiment, the vehicle/transmission control module 106 includes a vehicle control module (VCM) 120 and a transmission control module (TCM) 122, each having a computer system with a processor. An exemplary embodiment of such a computer system will be described further below in connection with FIG. 2. However, this may vary in other embodiments.

Also in a preferred embodiment, the vehicle/transmission control module 106 provides instructions as to the shifting between operating modes of the hybrid vehicle, and provides these instructions for implementation to the engine control module 112, which controls operation of the engine 114 and related components. The instructions are preferably generated by one or more processors of the vehicle/transmission control module 106, such as the exemplary processor of the exemplary computer system discussed further below in connection with FIG. 2. Also, as will be described further below in connection with an exemplary embodiment of a control process of FIG. 3, the one or more processors preferably receive a plurality of throttle position values, generate comparisons between different throttle position values over time, and generate the instructions for selectively allowing a shift between at least two of the plurality of operating modes based at least in part on the comparisons between the various throttle position values. The instructions are received and implemented by the engine control module 112 using one or more of the battery control module 110, the dual power inverter module 108, and/or the electric variable transmission 116. In other embodiments, various other components may be used.

Figure 2:
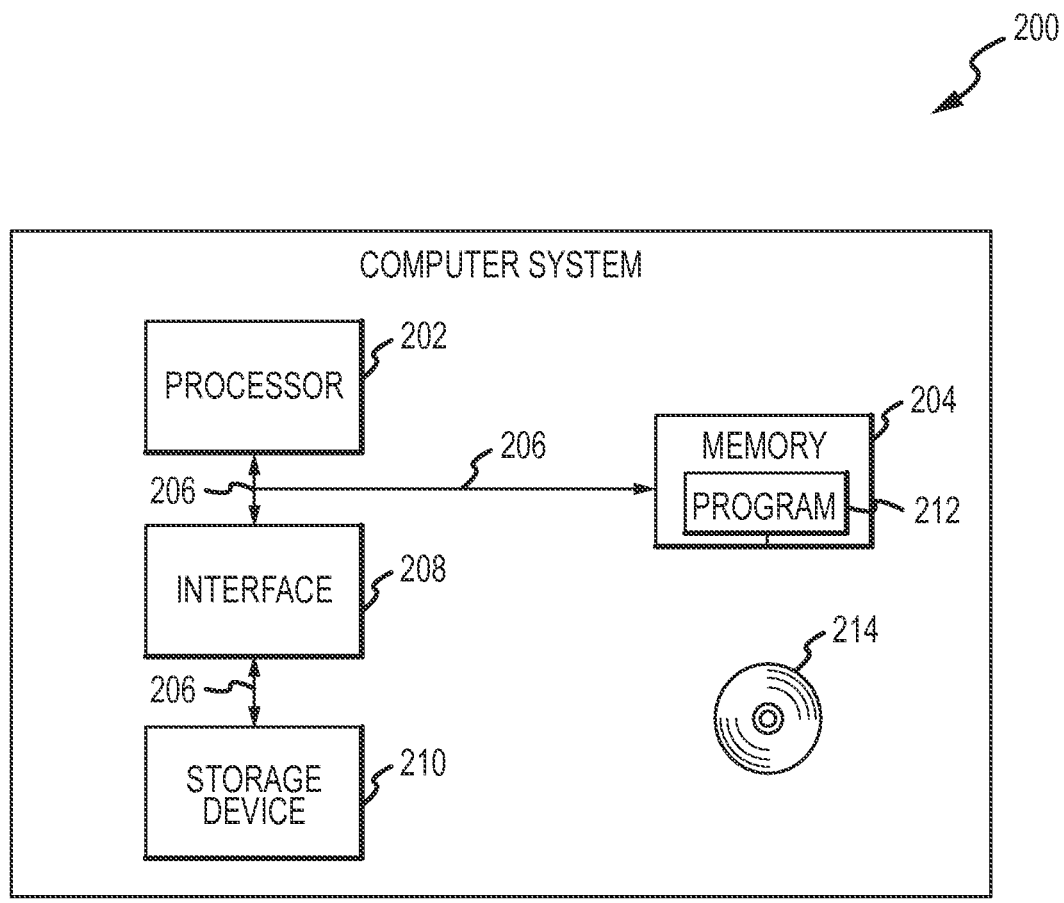
FIG. 2 is a functional block diagram of a computer system that can be implemented in connection with the control system of FIG. 1, in accordance with an exemplary embodiment of the present invention.

FIG. 2 is a functional block diagram of a computer system 200 for use in connection with the hybrid vehicle control system 100 of FIG. 1, and that can be used in implementing the control process described further below in connection with FIG. 3, in accordance with an exemplary embodiment of the present invention. For example, in a preferred embodiment, one or more of the vehicle control module 120 and/or the transmission control module 122 of the vehicle/transmission control module 106 includes such a computer system. Also, in a preferred embodiment, such computer system(s) are capable of having a software program product stored therein, for example to execute the control process described further below in connection with FIG. 3. It will be appreciated that these processes and systems may also be implemented in connection with any one or more of a number of other different types of computer systems and/or other systems and/or devices.

In the depicted embodiment, the computer system 200 includes a processor 202, a memory 204, a bus 206, an interface 208, and a storage device 210. The processor 202 performs the computation and control functions of the computer system 200, and may comprise any type of processor or multiple processors, single integrated circuits such as a microprocessor, or any suitable number of integrated circuit devices and/or circuit boards working in cooperation to accomplish the functions of a processing unit. During operation, the processor 202 executes one or more programs 212 preferably stored within the memory 204 and, as such, controls the general operation of the computer system 200.

In one embodiment, the memory 204 stores a program or programs 212 that executes one or more embodiments of the control process of the present invention, as discussed below in connection with FIG. 3. The memory 204 can be any type of suitable memory. The memory 204 may include one or more of various types of dynamic random access memory (DRAM) such as SDRAM, the various types of static RAM (SRAM), and the various types of non-volatile memory (PROM, EPROM, and flash). It should be understood that the memory 204 may be a single type of memory component, or it may be composed of many different types of memory components. In addition, the memory 204 and the processor 202 may be distributed across several different computers that collectively comprise the computer system 200. For example, a portion of the memory 204 may reside on a computer within a particular apparatus or process, and another portion may reside on a remote computer.

The bus 206 serves to transmit programs, data, status and other information or signals between the various components of the computer system 200. The bus 206 can be any suitable physical or logical means of connecting computer systems and components. This includes, but is not limited to, direct hard-wired connections, fiber optics, and infrared and wireless bus technologies.

The interface 208 allows communication to the computer system 200, for example from a system driver and/or another computer system, and can be implemented using any suitable method and apparatus. It can include one or more network interfaces to communicate with other systems or components. The interface 208 may also include one or more network interfaces to communicate with technicians, and/or one or more storage interfaces to connect to storage apparatuses, such as the storage device 210.

The storage device 210 can be any suitable type of storage apparatus, including direct access storage devices such as hard disk drives, flash systems, floppy disk drives and optical disk drives. In one exemplary embodiment, the storage device 210 comprises a program product from which memory 204 can receive a program 212 that executes one or more embodiments of one or more processes of the present invention, such as the control process described further below in connection with FIG. 3. In another exemplary embodiment, the program product may be directly stored in and/or otherwise accessed by the memory 204 and/or a disk such as that referenced below. As shown in FIG. 2, the storage device 210 can comprise a disk drive device that uses disks 214 to store data. As one exemplary implementation, the computer system 200 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 214), and transmission media such as digital and analog communication links. It will similarly be appreciated that the computer system 200 may also otherwise differ from the embodiment depicted in FIG. 2, for example in that the computer system 200 may be coupled to or may otherwise utilize one or more remote computer systems and/or other control systems.

Figure 3:
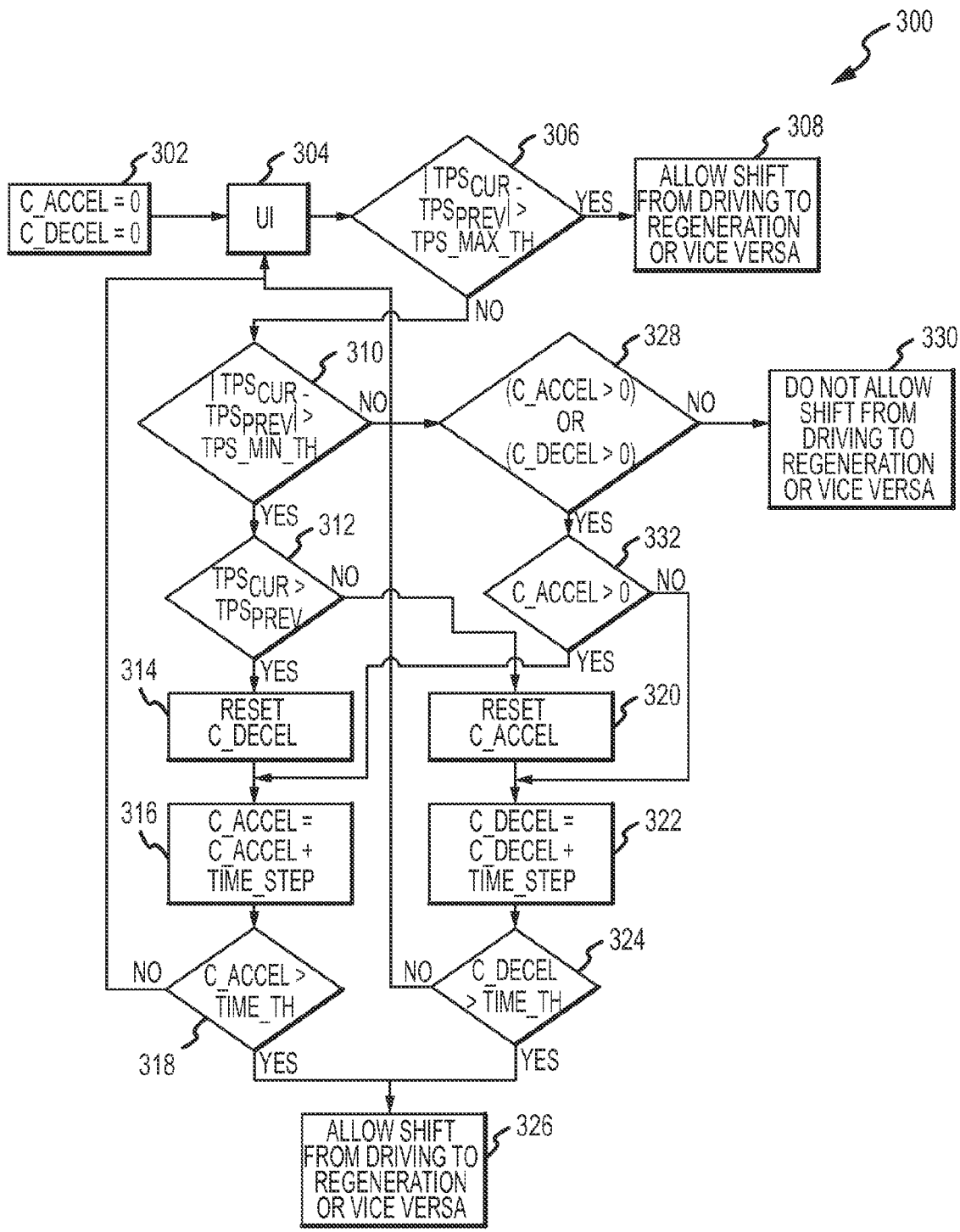
FIG. 3 is a flowchart of a process for controlling shifting between operating modes in a hybrid vehicle, in accordance with an exemplary embodiment of the present invention.

FIG. 3 is a flowchart of a control process 300 for controlling shifting between driving and regeneration operating modes in a hybrid vehicle, in accordance with an exemplary embodiment of the present invention. In a preferred embodiment, the control process 300 utilizes an acceleration parameter (C_accel) and a deceleration parameter (C_decel). As will be described in greater detail below, the acceleration parameter represents a count as to the number of consecutive time intervals for which a throttle position of the hybrid vehicle has either increased or has increased and remained the same (i.e., for which the throttle position has not decreased). Similarly, the deceleration parameter represents a count as to the number of consecutive time intervals for which the throttle position of the hybrid vehicle has either decreased or has decreased and remained the same (i.e., for which the throttle position has not increased).

The process begins with initializing the acceleration parameter and the deceleration parameter (step 302). In a preferred embodiment, both the acceleration parameter and the deceleration parameter are initialized equal to zero, as shown in FIG. 3. However, this may vary in other embodiments.

In addition, a plurality of values are obtained pertaining to a user interface, such as the user interface 102 of FIG. 1 (step 304). In a preferred embodiment, the plurality of values includes various throttle position values based on positions of an accelerator pedal of the hybrid vehicle over different periods of time, for example obtained via the user interface 102 and/or the one or more sensors 118 of FIG. 1. The throttle position values are based on the accelerator pedal position at various points in time during various iterations of the process.

In a preferred embodiment, a current throttle position value is obtained in step 304 during each iteration of the process, representing a current throttle position at a current point in time. This current throttle position value is considered to be the current throttle position value for the remainder of that iteration in which it is obtained. This current throttle position value will subsequently be considered to be a prior throttle position value as one or more new, more current throttle position values are obtained in subsequent iterations of step 304 at subsequent points in time.

The throttle position values will be used to make various comparisons and determinations, as described in detail below. In a preferred embodiment, each of these comparisons and determinations, as well as various other calculations, comparisons, determinations and inquiries, are performed by a processor of a computer system, such as the exemplary processor 202 of the exemplary computer system 200 of FIG. 2. As described above, preferably such processor 202 is part of the vehicle/transmission control module 106 and/or is executed based on a software program product used in connection therewith. During execution of the control process 300, the throttle position values, as well as the acceleration parameter, the deceleration parameter, and various other values referenced herein, are preferably stored in a memory, such as the memory 204 of the computer system 200 as depicted in FIG. 2 and described above in connection therewith.

The throttle position values are used to determine whether the difference, in absolute value terms, between a current throttle position value ($TPS_{cur}$) and a prior throttle position value ($TPS_{prev}$) is greater than a predetermined maximum threshold value (TPS_max_th) (step 306). In a preferred embodiment, the predetermined maximum threshold value represents a value such that, if a throttle position value exceeds the predetermined maximum threshold value, this difference represents a significant enough change in accelerator pedal position so as to indicate that a shift between operating modes is desired. Preferably the prior throttle position value corresponds to a point in time that is immediately prior to the current point in time for which the current throttle position value corresponds, for example in an immediately prior iteration. However, this may vary in certain embodiments.

If it is determined in step 306 that the difference in absolute value between the current throttle position value and the prior throttle position value is greater than the predetermined maximum threshold value, then a shift between driving and regeneration operating modes or vice versa is allowed for the hybrid vehicle (step 308). Specifically, the shift comprises a change from a driving operating mode to a regeneration operating mode, or vice versa. In a preferred embodiment, in step 308 and elsewhere in which shifts between operating modes are allowed (e.g. in step 326, described below), the shift is allowed by a mode ringing control module, such as the mode ringing control module (MRC) 104 of FIG. 1. Then, once the shift is allowed by the mode ringing control module, the decision and implementation of which operating mode to shift to is preferably conducted by a transmission control module, such as the transmission control module (TCM) 122 of FIG. 1.

Conversely, if it is determined in step 306 that the difference in absolute value between the current throttle position value and the prior throttle position value is less than or equal to the predetermined maximum threshold value, then the process proceeds with various additional steps to determine whether or not a shift between operating modes is allowed. These additional steps begin with a determination as to whether the difference in absolute value between the current throttle position value and the prior throttle position value is greater than a predetermined minimum threshold value (TPS_min_th) (step 310). In a preferred embodiment, the predetermined minimum threshold value represents a value such that, if a throttle position value is below the predetermined minimum threshold value, this difference represents a small enough change in accelerator pedal position so as to indicate that a shift between operating modes is not desired.

If it is determined in step 310 that the difference in absolute value between the current throttle position value and the prior throttle position value is greater than the predetermined minimum threshold value, then a determination is made as to whether the current throttle position value is greater than the prior throttle position value (step 312). Otherwise, if it is determined in step 310 that the difference in absolute value between the current throttle position value and the prior throttle position value is less than or equal to the predetermined minimum threshold value, then the process proceeds instead to step 328, as described further below.

If it is determined in step 312 that the current throttle position value is greater than the prior throttle position value, then the deceleration parameter is reset, preferably equal to zero (step 314), the acceleration parameter is incremented by a time step (step 316), and a determination is then made as to whether the acceleration parameter is greater than a predetermined time threshold (Time_th) (step 318). Conversely, if it is determined in step 312 that the current throttle position value is less than or equal to the prior throttle position value, then the acceleration parameter is reset, preferably equal to zero (step 320), the deceleration parameter is incremented by a time step (step 322), and a determination is then made as to whether the deceleration parameter is greater than the predetermined time threshold (step 324). In a preferred embodiment, the predetermined time threshold represents an amount of time or a number of iterations of the process such that, if the throttle position has either (a) increased or increased and remained the same (i.e. without an intervening decrease) or (b) decreased or decreased and remained the same (i.e. without an intervening increase) for an amount of time or a number of successive iterations equal to the predetermined time threshold, then this provides an indication that a shift between operating modes is desired.

If it is determined either in step 318 that the acceleration parameter is greater than the predetermined time threshold or in step 324 that the deceleration parameter is greater than the predetermine time threshold (whichever of steps 318 or 324 is currently being implemented in connection with a current iteration of the process, depending on the outcome of step 312 above in the current iteration), then a shift from driving to regeneration operating modes or vice versa is allowed for the hybrid vehicle (step 326). Otherwise, the process returns to step 304, in which new throttle position values are obtained for an immediately successive time interval, and a new iteration begins with step 304 using the updated values of the acceleration and deceleration parameters from the latest iteration (i.e. these values are not initialized for the new iteration as they were in step 302 for the initial iteration).

As referenced above, if it is determined in step 310 that the difference in absolute value between the current throttle position value and the prior throttle position value is less than or equal to the predetermined minimum threshold value, the process proceeds to step 328. In step 328, a determination is made as to whether either of the acceleration parameter or the deceleration parameter is greater than zero. If it is determined in step 328 that neither the acceleration parameter nor the deceleration parameter is greater than zero, then a shift from driving to regeneration operating modes or vice versa is not allowed for the hybrid vehicle (step 330).

Conversely, if it is determined in step 328 that either of the acceleration parameter or the deceleration parameter is greater than zero, then a determination is made as to whether the acceleration parameter is greater than zero (step 332). If it is determined in step 332 that the acceleration parameter is greater than zero, then the process proceeds to the above-referenced step 316, in which the acceleration parameter is incremented by a time step, after which a determination is made as to whether the acceleration parameter is greater than the predetermined time threshold (the above-referenced step 318). Conversely, if it is determined in step 332 that the acceleration parameter is less than or equal to zero, then the process proceeds instead to the above-referenced step 322, in which the deceleration parameter is incremented by a time step, after which a determination is made as to whether the deceleration parameter is greater than the predetermined time threshold (the above-referenced step 324).

As described above, if it is determined either in step 318 that the acceleration parameter is greater than the predetermined time threshold or in step 324 that the deceleration parameter is greater than the predetermine time threshold (whichever of steps 318 or 324 is currently being implemented in connection with a current iteration of the process, in this case depending on the outcome of step 332 above in the current iteration), then a shift between operating modes is allowed for the hybrid vehicle (step 326). Otherwise, the process returns to step 304, in which new throttle position values are obtained for an immediately successive time interval, and a new iteration begins with step 304 using the most recently updated values of the acceleration and deceleration parameters from the most recent iteration (i.e. these values are not initialized for the new iteration as they were in step 302 for the initial iteration).

Accordingly, a shift between operational modes is allowed for the hybrid vehicle in situations in which the current throttle position value is significantly larger than an immediately prior throttle position value (step 308), or in which the throttle position values have either steadily increased without an intervening decrease or have steadily decreased without an intervening decrease for a predetermined number of time intervals or iterations (step 326). Otherwise, the shift is not allowed, at least until one of these criteria is satisfied.

Thus, the control process 300 allows for a shift between operating modes for the hybrid vehicle only in situations in which such a shift is truly required or desired. The control process 300 does not allow for a shift when fluctuations in the accelerator pedal position reflect inadvertent changes in accelerator pedal position values rather than an intent for a shift between operating modes. Such inadvertent changes in accelerator pedal position values may be caused, for example, by a speed bump in the road, rough road conditions, uneven application of the accelerator pedal by the driver, or other situations that do not necessarily reflect a desire for a shift between operating modes.

In one preferred embodiment, the control process 300 may be used when there are small changes in the driver's throttle position. If two throttle positions (e.g. at two respective points in time) differ by larger values (e.g. by the maximum threshold value, TPS_max_th, or more), then, in one preferred embodiment, the decision regarding the shifting or changing in operating modes may be undertaken by one or more existing control modules, such as a transmission control module (TCM). It will also be appreciated that various steps of the control process 300 may vary, and/or may be conducted in a different order than that depicted in FIG. 3 and/or described herein.

Figure 4:
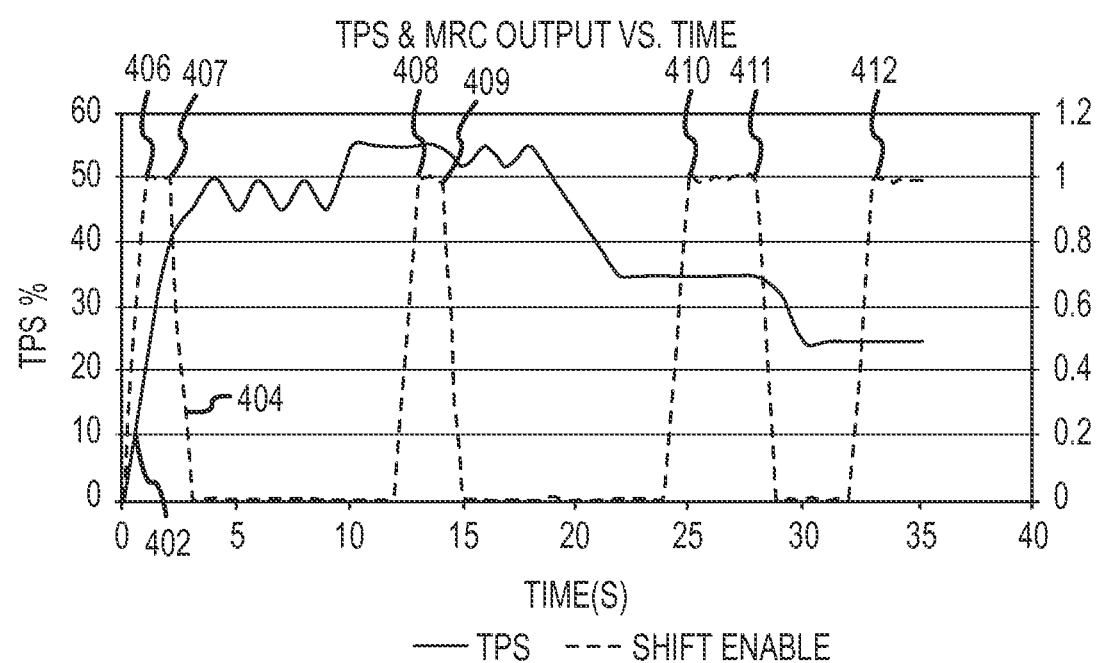
FIG. 4 is a graphical representation of an implementation of the process of FIG. 3 in connection with throttle position values over time in a hybrid vehicle, in accordance with an exemplary embodiment of the present invention.

FIG. 4 depicts an exemplary implementation of the control process 300 of FIG. 3 in connection with throttle position values over time in a hybrid vehicle, in accordance with an exemplary embodiment of the present invention. Specifically, FIG. 4 includes a throttle position curve 402 and an operating mode shifting curve 404 in accordance with an exemplary embodiment of the present invention. In the embodiment of FIG. 4, shifts in operating modes for the hybrid vehicle are allowed beginning at points 406, 408, 410, and 412.

For example, between points 406 and 407, a shift between operating modes is allowed because of a substantial increase in throttle position values over a short interval of time, as indicated by the sharp incline of the throttle position curve 402 approximately between time value zero and time value two (corresponding to step 308 in the control process 300 of FIG. 3). Between points 408 and 409, a shift between operating modes is allowed because the throttle position values have increased and remained the same for a sufficient amount of time without an intervening decrease in throttle position values, as indicated by the incline of the throttle position curve 402 approximately between time value nine and time value thirteen (corresponding to step 326 in the control process 300 of FIG. 3).

In addition, between points 410 and 411, a shift in operating modes is allowed because the throttle position values have decreased and remained the same for a sufficient amount of time without an intervening increase in throttle position values, as indicated by the sharp downward incline of the throttle position curve 402 approximately between time value eighteen and time value twenty six (also corresponding to step 326 in the control process 300 of FIG. 3). Similarly, beginning with point 412, another shift in operating modes is allowed because the throttle position values have decreased and remained the same for a sufficient amount of time without an intervening increase in throttle position values, as indicated by the sharp downward incline of the throttle position curve 402 approximately between time value twenty nine and time value thirty three (also corresponding to step 326 in the control process 300 of FIG. 3).

Figure 5A:
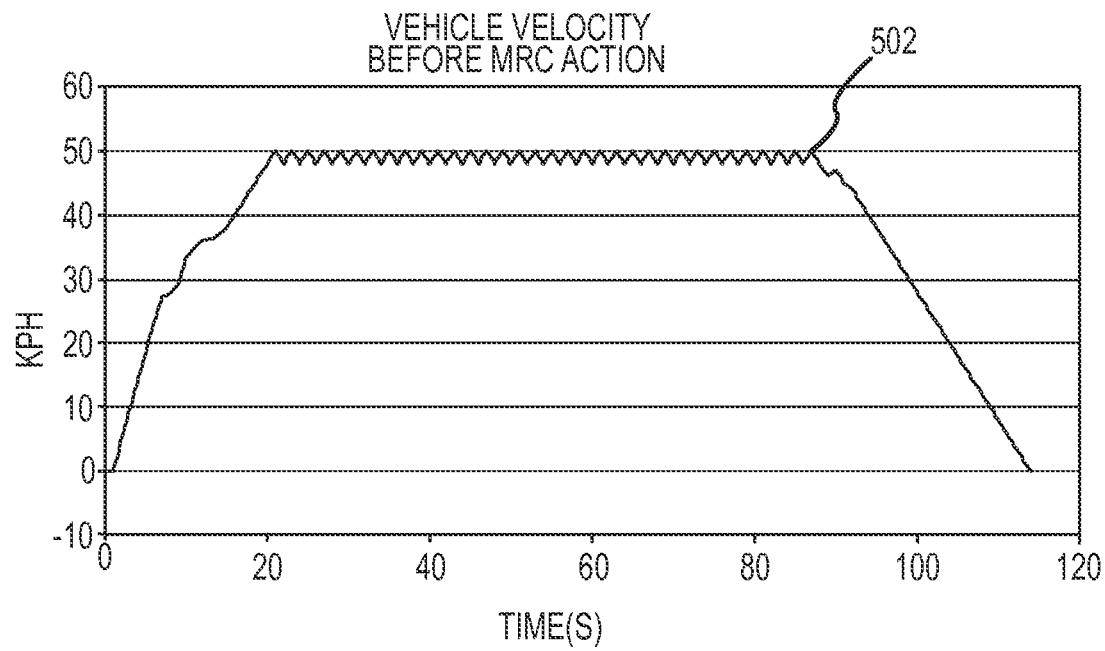
FIGS. 5a and 5b are graphical representations of an implementation of the process of FIG. 3 in connection with velocity of a hybrid vehicle over time, in accordance with an exemplary embodiment of the present invention.
Figure 5B:
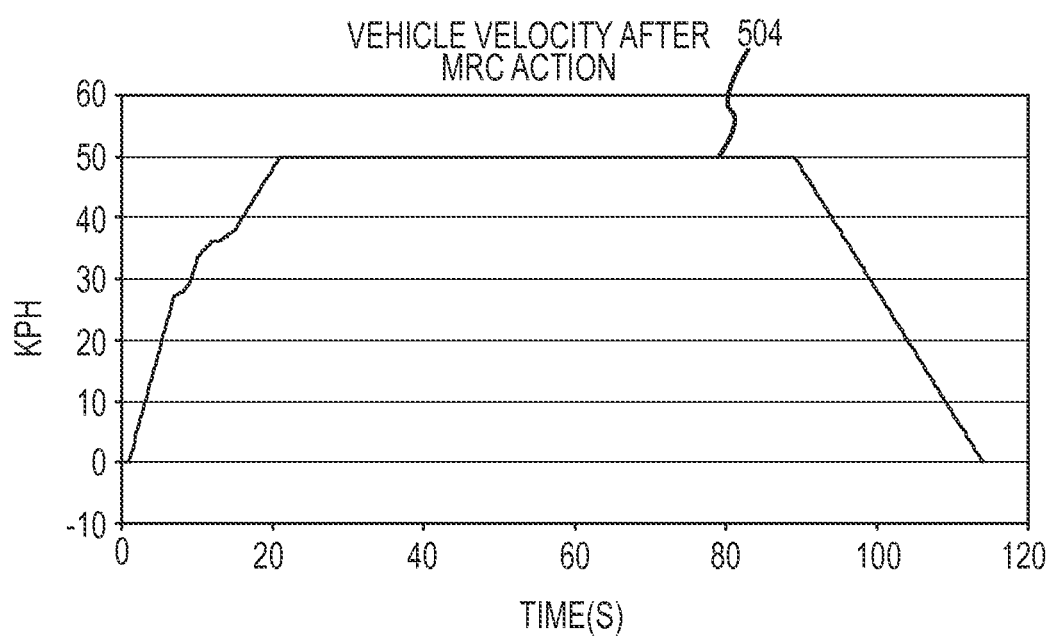

FIGS. 5a, 5b, 6a, 6b, 7, 8a, and 8b illustrate various potential benefits of exemplary embodiments of the control process 300 for improved drivability, performance, and durability of hybrid vehicles and/or components thereof. FIGS. 5a and 5b illustrate how an exemplary embodiment of the control process 300 of FIG. 3 can result in a smoother velocity for a hybrid vehicle over time because of the reduction in unwanted or unnecessary shifts in operating modes. Specifically, FIG. 5a includes a first graph 502 of hybrid vehicle velocity over time without implementation of the control process 300, while FIG. 5b depicts a second graph 504 of hybrid vehicle velocity over time with the implementation of an exemplary embodiment of the control process 300. As shown in FIGS. 5a and 5b, the second graph 504 illustrates a much smoother hybrid vehicle velocity with the implementation of the exemplary embodiment of the control process 300 of FIG. 3.

Figure 6A:
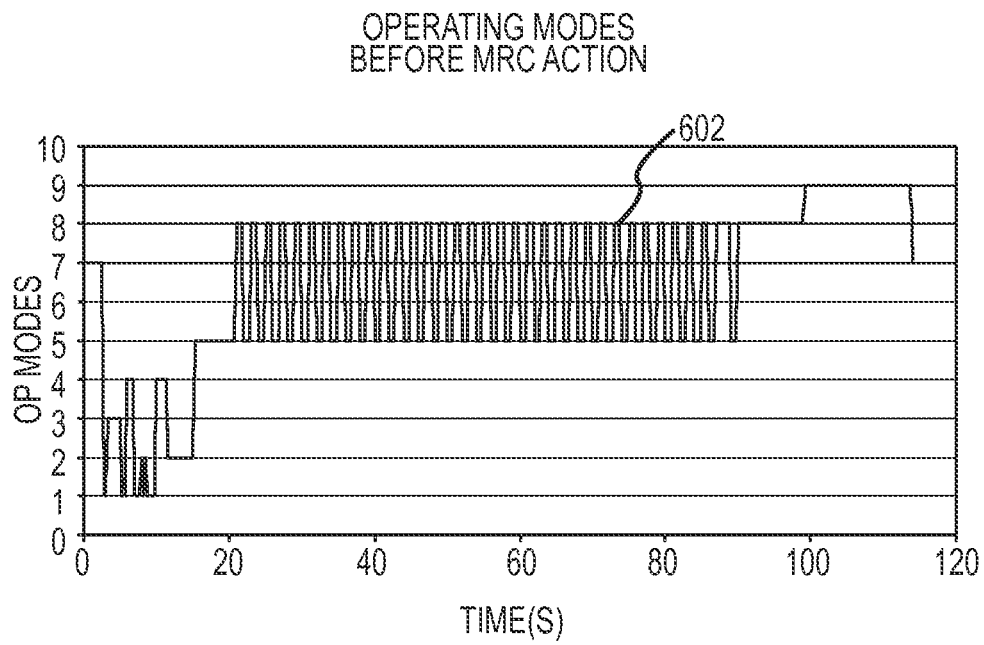
FIGS. 6a and 6b are graphical representations of an implementation of the process of FIG. 3 in connection with operating mode shifts over time in a hybrid vehicle, in accordance with an exemplary embodiment of the present invention.
Figure 6B:
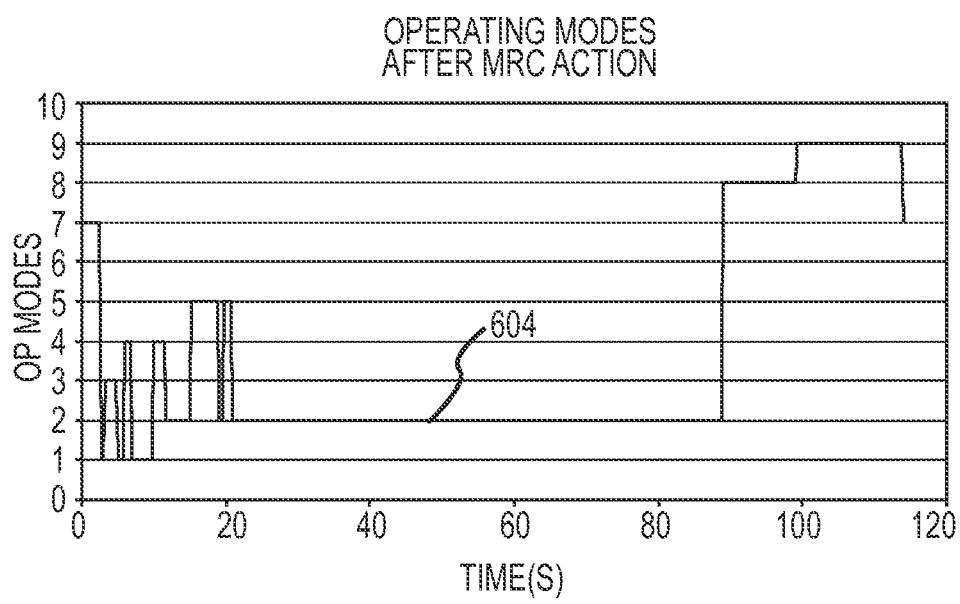

FIGS. 6a and 6b illustrate how an exemplary embodiment of the control process 300 of FIG. 3 can result in reduced oscillation between operating modes for a hybrid vehicle over time. Specifically, FIG. 6a includes a first graph 602 of hybrid vehicle operating modes over time without implementation of the control process 300, while FIG. 6b includes a second graph 604 of hybrid vehicle operating modes over time with the implementation of an exemplary embodiment of the control process 300. As shown in FIGS. 6a and 6b, the second graph 604 illustrates a much reduced oscillation pattern between operating modes of the hybrid vehicle with the implementation of the exemplary embodiment of the control process 300.

Figure 7:
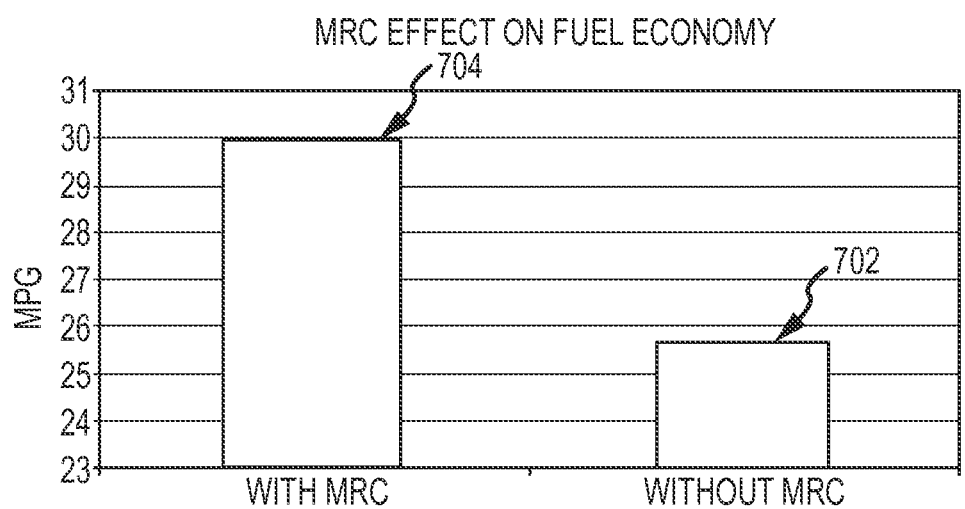
FIG. 7 is a graphical representation of an implementation of the process of FIG. 3 in connection with fuel economy in a hybrid vehicle, in accordance with an exemplary embodiment of the present invention.

FIG. 7 illustrates how an exemplary embodiment of the control process 300 of FIG. 3 can result in improved fuel economy for a hybrid vehicle. Specifically, FIG. 7 includes a first chart 702 of hybrid vehicle fuel economy without implementation of the control process 300, along with a second chart 704 of hybrid vehicle fuel economy with the implementation of an exemplary embodiment of the control process 300. As shown in FIG. 7, the second chart 704 illustrates a much improved fuel economy with the implementation of the exemplary embodiment of the control process 300.

Figure 8A:
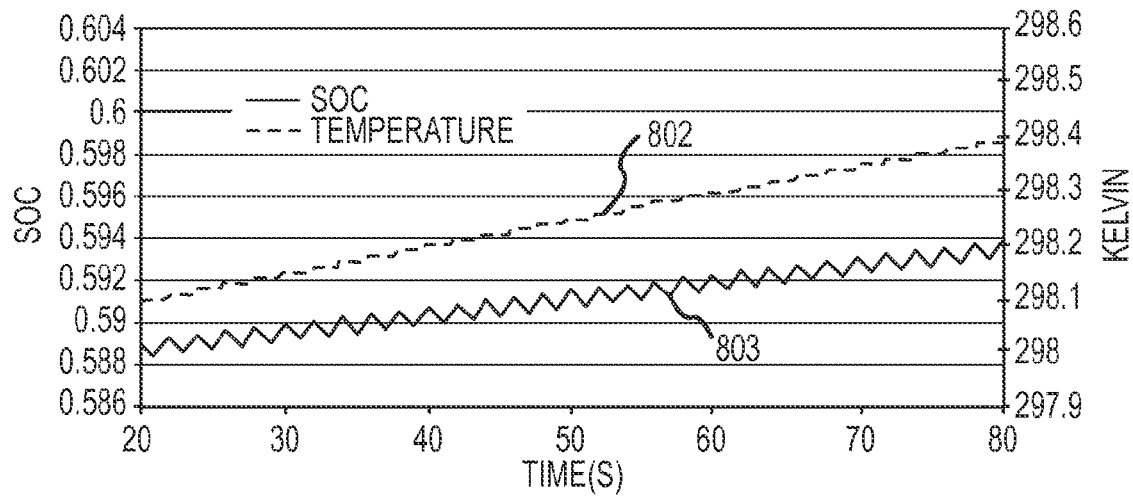
FIGS. 8a and 8b are graphical representations of an implementation of the process of FIG. 3 in connection with a battery temperature and a state of charge in a hybrid vehicle, in accordance with an exemplary embodiment of the present invention.
Figure 8B:
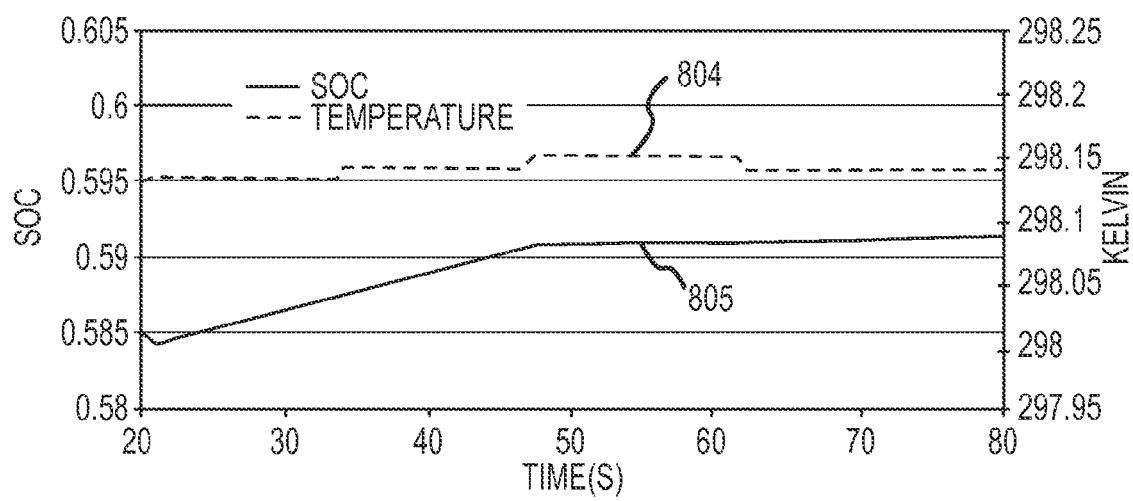

FIGS. 8a and 8b illustrate how an exemplary embodiment of the control process 300 of FIG. 3 can result in a more constant battery temperature and state of charge for a hybrid vehicle. Specifically, FIG. 8a includes first graphs 802, 803 of hybrid vehicle battery temperature and state of charge, respectively, without implementation of the control process 300, while FIG. 8b includes second graphs 804, 805 of hybrid vehicle battery temperature and state of charge, respectively, with the implementation of an exemplary embodiment of the control process 300. As shown in FIGS. 8a and 8b, the second graphs 804, 805 illustrate a significantly more steady battery temperature and state of charge, respectively, for the hybrid vehicle with the implementation of the exemplary embodiment of the control process 300.

Accordingly, an improved system for controlling shifting between a plurality of operating modes in a hybrid vehicle is provided. An improved program product is also provided for use in such an improved system. In addition, an improved method is provided for controlling shifting between a plurality of operating modes in a hybrid vehicle. The improved system, program product, and method allow for a reduction in undesired shifting between operating modes in a hybrid vehicle, to thereby improve longevity and durability of the hybrid vehicle and/or components thereof, to thereby improve the fuel economy of the hybrid vehicle, and to provide an improved driving experience.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling shifting between a plurality of operating modes in a hybrid vehicle having a regenerative braking feature, the method comprising the steps of: obtaining a plurality of throttle position calculating a difference between a first throttle position value of the plurality of throttle position values and a second throttle position value of the plurality of throttle position values, wherein the first throttle position value represents a current throttle position value occurring at a current point in time, and the second throttle position value represents a previous throttle position value occurring at a prior point in time before the current point; and selectively allowing a shift between a first operating mode of the plurality of operating modes, in which the regenerative braking feature is in use, and a second operating mode of the plurality of operating modes, in which the regenerative braking feature is not in use, based at least in part on the difference between the first and second throttle position values; wherein the step of selectively allowing a shift comprises the step of: selectively allowing a shift between the first and second operating modes, based at least in part on whether an absolute value of the difference between the current and the previous throttle position values is greater than a first predetermined value, and based at least in part on whether the absolute value of the difference between the current and the previous throttle position values is less than a second predetermined value.

2. A method for controlling shifting between a plurality of operating modes in a hybrid vehicle having a regenerative braking feature, the method comprising the steps of:
   obtaining a plurality of throttle position values;
   calculating a difference between a first throttle position value of the plurality of throttle position values and a second throttle position value of the plurality of throttle position values, wherein the first throttle position value represents a current throttle position value occurring at a current point in time, and the second throttle position value represents a previous throttle position value occurring at a prior point in time before the current point; and
   selectively allowing a shift between a first operating mode of the plurality of operating modes, in which the regenerative braking feature is in use, and a second operating mode of the plurality of operating modes, in which the regenerative braking feature is not in use, based at least in part on the difference between the first and second throttle position values,
   wherein the plurality of throttle position values further comprises a plurality of additional prior throttle position values at additional respective points in time before the prior point, and the method further comprises the steps of:
   subtracting each of the plurality of additional prior throttle position values from an immediately subsequent throttle position value, to thereby generate a plurality of additional differences; and
   selectively allowing the shift between the first and second operating modes, only if the difference between the current and the previous throttle position values and each of the plurality of additional differences are all greater than a predetermined threshold value.

3. A method for controlling shifting between a plurality of operating modes in a hybrid vehicle having a regenerative braking feature, the method comprising the steps of: obtaining a plurality of throttle position calculating a difference between a first throttle position value of the plurality of throttle position values and a second throttle position value of the plurality of throttle position values, wherein the first throttle position value represents a current throttle position value occurring at a current point in time, and the second throttle position value represents a previous throttle position value occurring at a prior point in time before the current point; and selectively allowing a shift between a first operating mode of the plurality of operating modes, in which the regenerative braking feature is in use, and a second operating mode of the plurality of operating modes, in which the regenerative braking feature is not in use, based at least in part on the difference between the first and second throttle position values; wherein the step of selectively allowing a shift between the first operating mode and the second operating mode further comprises the step of: selectively allowing a shift between the first operating mode and the second operating mode based on an acceleration parameter comprising an acceleration count as to a number of consecutive, multiple time intervals for which the throttle position for the hybrid vehicle has increased or remained substantially constant.

4. The method of claim 3, further comprising the steps of:
   incrementing the acceleration count when the throttle position has increased for a current time interval;
   incrementing the acceleration count if the acceleration count is already greater than zero and the throttle position has not decreased by at least a predetermined amount for the current time interval; and
   re-setting the acceleration count if the throttle position has decreased by at least the predetermined amount for the current time interval.

5. The method of claim 3, wherein the step of selectively allowing a shift between the first operating mode and the second operating mode further comprises the step of:
   selectively allowing a shift between the first operating mode and the second operating mode based on a deceleration parameter comprising a deceleration count as to a number of consecutive, multiple time intervals for which the throttle position for the hybrid vehicle has decreased or remained substantially constant.

6. The method of claim 5, further comprising the steps of:
   incrementing the acceleration count when the throttle position has increased by at least a predetermined amount for a current time interval;
   incrementing the deceleration count when the throttle position has decreased by at least the predetermined amount for the current time interval;
   incrementing the acceleration count if the acceleration count is already greater than zero and the throttle position has not decreased by at least the predetermined amount for the current time interval;
   incrementing the deceleration count if the deceleration count is already greater than zero and the throttle position has not increased by at least the predetermined amount for the current time interval;

re-setting the acceleration count if the throttle position has decreased by at least the predetermined amount for the current time interval, if the acceleration count was greater than zero; and re-setting the deceleration count if the throttle position has increased by at least the predetermined amount for the current time interval, if the deceleration count was greater than zero.

7. A program product for controlling shifting between a plurality of operating modes in a hybrid vehicle having a regenerative braking feature, the program product comprising: a program configured to at least facilitate: obtaining a plurality of throttle position values; calculating a difference between a first throttle position value of the plurality of throttle position values and a second throttle position value of the plurality of throttle position values, wherein the first throttle position value represents a current throttle position value occurring at a current point in time, and the second throttle position value represents a previous throttle position value occurring at a prior point in time before the current point; selectively allowing a shift between a first operating mode of the plurality of operating modes, in which the regenerative braking feature is in use, and a second operating mode of the plurality of operating modes, in which the regenerative braking feature is not in use, based at least in part on the difference between the first and second throttle position values; and a computer-readable signal-bearing media bearing the program; wherein the shift between the first and second operating modes is selectively allowed based at least in part on whether an absolute value of the difference between the current and the previous throttle position values is greater than a first predetermined value, and based at least in part on whether the absolute value of the difference between the current and the previous throttle position values is less than a second predetermined value.

8. The program product of claim 7, wherein:

the plurality of throttle position values further comprises a plurality of additional prior throttle position values occurring at additional respective points in time before the prior point; and the program is further configured to at least facilitate subtracting each of the plurality of additional prior throttle position values from an immediately subsequent throttle position value, to thereby generate a plurality of additional differences; and the shift between the first and second operating modes is selectively allowed based also at least in part on whether the difference between the current and the previous throttle position values and each of the plurality of additional differences are all greater than a predetermined threshold value.

9. A program product for controlling shifting between a plurality of operating modes in a hybrid vehicle having a regenerative braking feature, the program product comprising: a program configured to at least facilitate: obtaining a plurality of throttle position values; calculating a difference between a first throttle position value of the plurality of throttle position values and a second throttle position value of the plurality of throttle position values, wherein the first throttle position value represents a current throttle position value occurring at a current point in time, and the second throttle position value represents a previous throttle position value occurring at a prior point in time before the current point; selectively allowing a shift between a first operating mode of the plurality of operating modes, in which the regenerative braking feature is in use, and a second operating mode of the plurality of operating modes, in which the regenerative braking feature is not in use, based at least in part on the difference between the first and second throttle position values; and a computer-readable signal-bearing media bearing the program; wherein the program is further configured to at least facilitate selectively allowing a shift between the first operating mode and the second operating mode based on an acceleration parameter comprising an acceleration count as to a number of consecutive, multiple time intervals for which the throttle position for the hybrid vehicle has increased or remained substantially constant.

10. The program product of claim 9, wherein the program is further configured to at least facilitate:

incrementing the acceleration count when the throttle position has increased for a current time interval;

incrementing the acceleration count if the acceleration count is already greater than zero and the throttle position has not decreased by at least a predetermined amount for the current time interval; and re-setting the acceleration count if the throttle position has decreased by at least the predetermined amount for the current time interval.

11. The program product of claim 9, wherein the program is further configured to at least facilitate selectively allowing a shift between the first operating mode and the second operating mode based on a deceleration parameter comprising a deceleration count as to a number of consecutive, multiple time intervals for which the throttle position for the hybrid vehicle has decreased or remained substantially constant.

12. A system for controlling shifting between a plurality of operating modes in a hybrid vehicle having a regenerative braking feature, the system comprising: a sensor configured to obtain a plurality of throttle position values; a first control module coupled to the sensor, the first control module configured to: receive the plurality of throttle position values; calculate a difference between a first throttle position value of the plurality of throttle position values and a second throttle position value of the plurality of throttle position values, wherein the first throttle position value represents a current throttle position value occurring at a current point in time, and the second throttle position value represents a previous throttle position value occurring at a prior point in time before the current point; and generate an instruction for selectively allowing a shift between a first operating mode of the plurality of operating modes, in which the regenerative braking feature is in use, and a second operating mode of the plurality of operating modes, in which the regenerative braking feature is not in use, based at least in part on the comparison between the first and second throttle position values; and a second control module coupled to the first control module and configured to: receive the instruction from the first control module; and selectively allow the shift between the first and second operating modes based at least in part on the instruction; wherein the first control module is further configured to generate an instruction for selectively allowing a shift between the first operating mode and the second operating mode based on an acceleration parameter comprising an acceleration count as to a number of consecutive, multiple time intervals for which the throttle position for the hybrid vehicle has increased or remained substantially constant.

13. The system of claim 12, wherein the first control module is further configured to generate instructions for:

incrementing the acceleration count when the throttle position has increased for a current time interval;

incrementing the acceleration count if the acceleration count is already greater than zero and the throttle position has not decreased by at least a predetermined amount for the current time interval; and re-setting the acceleration count if the throttle position has decreased by at least the predetermined amount for the current time interval.

14. The system of claim 12, wherein the first control module is further configured to generate an instruction for selectively allowing a shift between the first operating mode and the second operating mode based on a deceleration parameter comprising a deceleration count as to a number of consecutive, multiple time intervals for which the throttle position for the hybrid vehicle has decreased or remained substantially constant.

15. The system of claim 14, wherein the first control module is further configured to generate an instruction for:

incrementing the acceleration count when the throttle position has increased by at least a predetermined amount for a current time interval;

incrementing the deceleration count when the throttle position has decreased by at least the predetermined amount for the current time interval;

incrementing the acceleration count if the acceleration count is already greater than zero and the throttle position has not decreased by at least the predetermined amount for the current time interval;

incrementing the deceleration count if the deceleration count is already greater than zero and the throttle position has not increased by at least the predetermined amount for the current time interval;

re-setting the acceleration count if the throttle position has decreased by at least the predetermined amount for the current time interval, if the acceleration count was greater than zero; and re-setting the deceleration count if the throttle position has increased by at least the predetermined amount for the current time interval, if the deceleration count was greater than zero.

16. A system for controlling shifting between a plurality of operating modes in a hybrid vehicle having a regenerative braking feature, the system comprising: a sensor configured to obtain a plurality of throttle position values; a first control module coupled to the sensor, the first control module configured to: receive the plurality of throttle position values; calculate a difference between a first throttle position value of the plurality of throttle position values and a second throttle position value of the plurality of throttle position values, wherein the first throttle position value represents a current throttle position value occurring at a current point in time, and the second throttle position value represents a previous throttle position value occurring at a prior point in time before the current point; and generate an instruction for selectively allowing a shift between a first operating mode of the plurality of operating modes, in which the regenerative braking feature is in use, and a second operating mode of the plurality of operating modes, in which the regenerative braking feature is not in use, based at least in part on the comparison between the first and second throttle position values; and a second control module coupled to the first control module and configured to: receive the instruction from the first control module; and selectively allow the shift between the first and second operating modes based at least in part on the instruction; wherein the shift between the first and second operating modes is selectively allowed based at least in part on whether: the difference between the current and the previous throttle position values is greater than a first predetermined value; and the difference between the current and the previous throttle position values is greater than a second predetermined value; the plurality of throttle position values further comprises a plurality of additional prior throttle position values occurring at additional respective points in time before the prior point; the second control module is further configured to at least facilitate subtracting each of the plurality of additional prior throttle position values from an immediately subsequent throttle position value, to thereby generate a plurality of additional differences; and the shift between first and second operating modes is selectively allowed based also at least in part on whether the difference between the current and the previous throttle position values and each of the plurality of additional differences all are greater than a predetermined threshold value.

* * * * *